United States Patent
Liao

(10) Patent No.: US 7,187,944 B2
(45) Date of Patent: Mar. 6, 2007

(54) ONBOARD CELL PHONE AUTOMATIC DIALING DEVICE

(76) Inventor: Fu-Chang Liao, No. 50, Lane 1412, Chunghua Rd., Toufen Chen, Miaoli Hsien (TW)

( * ) Notice: Subject to any disclaimer, the term of this patent is extended or adjusted under 35 U.S.C. 154(b) by 355 days.

(21) Appl. No.: 10/975,546

(22) Filed: Oct. 29, 2004

(65) Prior Publication Data

US 2005/0101361 A1   May 12, 2005

(30) Foreign Application Priority Data

Nov. 7, 2003   (TW) .............. 92219755 U

(51) Int. Cl.
*H04B 1/38* (2006.01)
*H04M 1/00* (2006.01)

(52) U.S. Cl. .............. 455/550.1; 455/575.1; 455/556.1; 455/90.3; 455/66.1

(58) Field of Classification Search ............ 455/575.1, 455/556.1, 550.1, 90.3, 66.1
See application file for complete search history.

(56) References Cited

U.S. PATENT DOCUMENTS

| | | | | |
|---|---|---|---|---|
| 5,930,724 A | * | 7/1999 | Yanagida | 455/575.1 |
| 6,147,598 A | * | 11/2000 | Murphy et al. | 340/426.19 |
| 6,803,944 B2 | * | 10/2004 | Oku et al. | 348/163 |
| 6,879,247 B2 | * | 4/2005 | Shimomura et al. | 340/426.18 |
| 2003/0043017 A1 | * | 3/2003 | Tanaka | 340/5.2 |

* cited by examiner

*Primary Examiner*—Matthew Anderson
*Assistant Examiner*—Tuan Pham
(74) *Attorney, Agent, or Firm*—Hershkovitz & Associates; Abe Hershkovitz

(57) ABSTRACT

An onboard automatic cell phone dialing device includes a magnet received in a casing and selectively energized by a control circuit, a dialing finger selectively movable relative to a bracket which is adjustably sandwiched between two crossbars inside the casing and a spacer sandwiched between the two crossbars and pivotally connected to opposed inner sides inside the casing to drive the dialing finger downward to engage with the dialing button on the cell phone under the influence of the energized magnet.

1 Claim, 2 Drawing Sheets

ONBOARD CELL PHONE AUTOMATIC DIALING DEVICE

BACKGROUND OF THE INVENTION

1. Field of the Invention

The present invention relates to an onboard cell phone automatic dialing device, and more particularly to an automatic dialing device for pressing a dialing button on a cell phone so as to continuously send out a warning signal when the vehicle in which the cell phone is positioned is in an irregular situation.

2. Description of Related Art

Despite advances in vehicle security technology, car thieves are still able to steal a car within seconds. The onboard alarm systems become the first target to be destroyed when stealing a car. Therefore, long before the car or its contents are stolen, the alarm systems are silenced and the thieves are able to take their time to move the car to another place for disassembling etc. Furthermore, even though the car is equipped with a warning system depending on the electrical circuit mounted inside the vehicle, once the electrical circuit is damaged, the alarm system is useless. Some cars are equipped with a global positioning system (GPS) to let the car owner know the car's whereabouts once the car is reported stolen. However, the GPS can only provide information concerning where the car is located and not the current situation of the car especially when it is being stolen.

To overcome the shortcomings, the present invention tends to provide an improved onboard automatic cell phone dialing device to mitigate the aforementioned problems.

SUMMARY OF THE INVENTION

The primary objective of the present invention is to provide an improved onboard cell phone dialing device to automatically press a dialing button of a cell phone received in a casing which is mounted inside the vehicle such that the user is able to immediately know that there is an abnormal situation happening to the car and from the continuous signal dispatch from the cell phone, the authority is able to have the instant information of the car's whereabouts.

Other objects, advantages and novel features of the invention will become more apparent from the following detailed description when taken in conjunction with the accompanying drawings.

DETAILED DESCRIPTION OF THE PREFERRED EMBODIMENT

Figure 1:
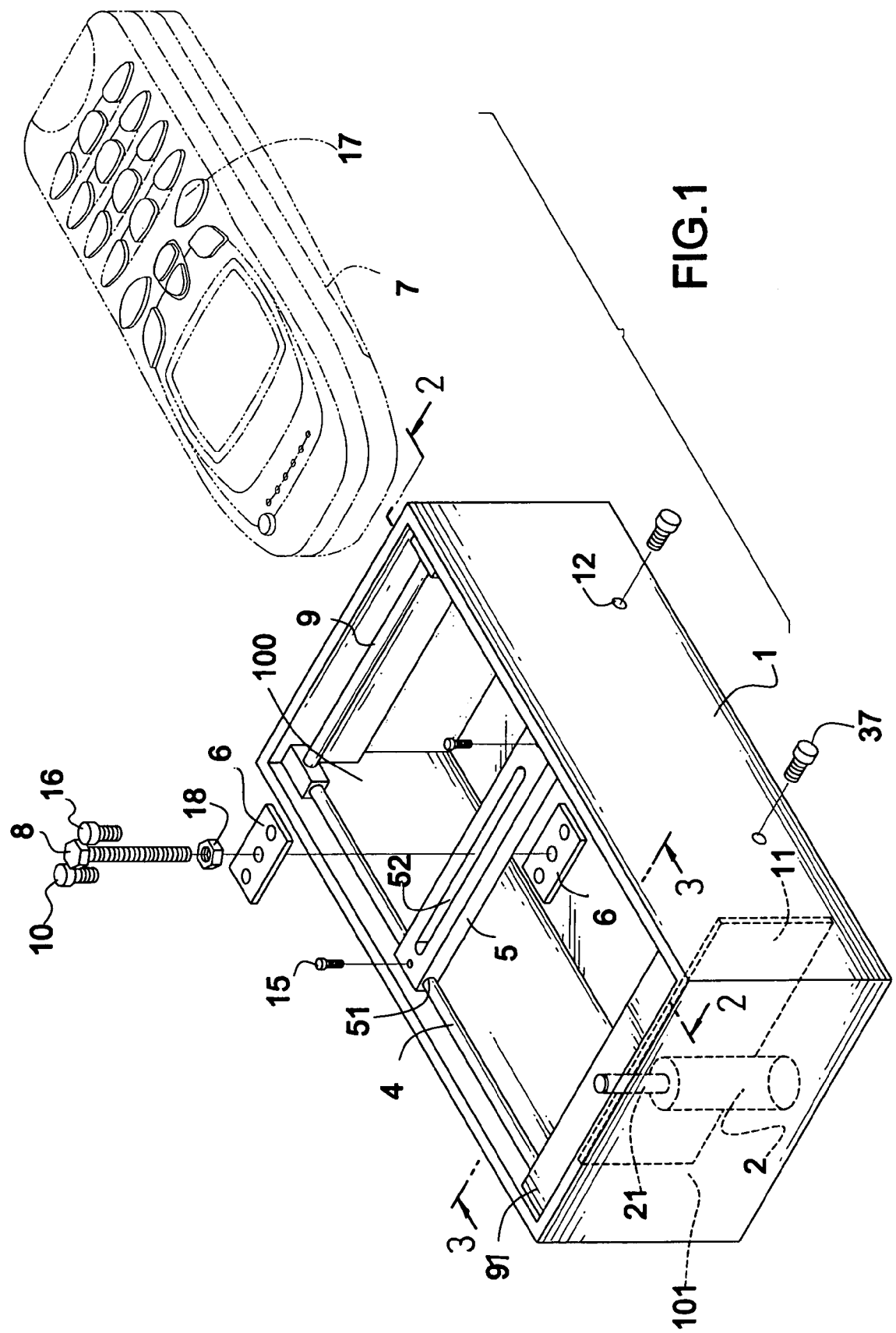
FIG. 1 is an exploded perspective view of the cell phone automatic dialing device of the present invention.

With reference to FIG. 1, it is noted that the onboard cell phone automatic dialing device in accordance with the present invention includes a casing (1) with one open end. The casing (1) is provided with a baffle (11) formed inside the casing (1) to divide the interior of the casing (1) into a first receiving room (100) for receiving therein a cell phone (7) and a second receiving room (101), two pairs of through holes (12) respectively defined in two opposite sides of the casing (1) to correspond to threaded bolts (37), an induced magnet (2) securely received in the second receiving room (101) and having a bar (21) extending out of and movably connected to the induced magnet (2), two crossbars (4) respectively provided on two opposed inner sides of the casing (1), a spacer (9) having two ends respectively extending to two distal ends of the crossbars (4) to pivotally connect to the two opposed inner sides of the casing (1), and a connection plate (91) securely connected to two proximal ends of the two crossbars (4) and a free end of the bar (21) such that when the bar (21) is moved relative to the induced magnet (2), the connection plate (91) is also driven to move, which results in the movement of the two crossbars (4).

Figure 2:
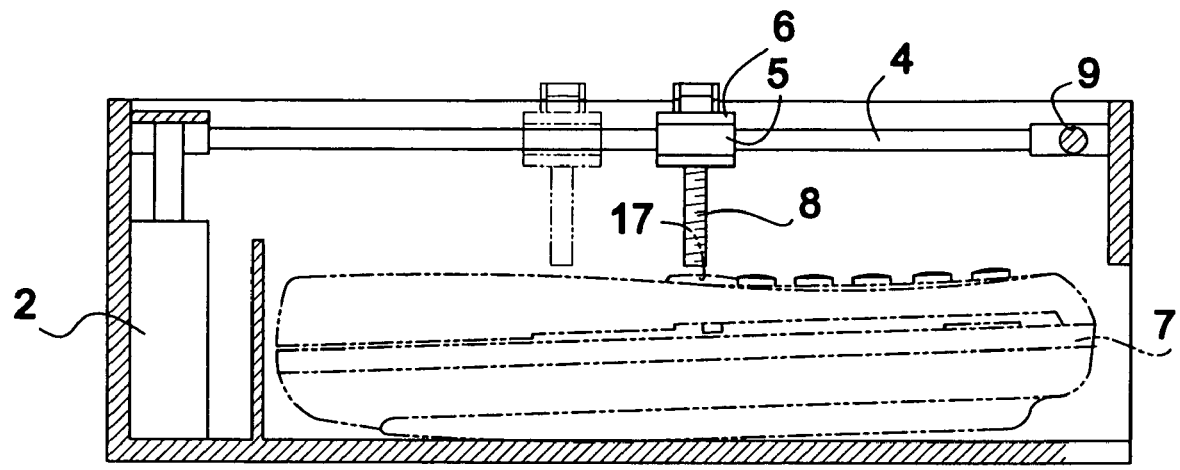
FIG. 2 is a schematically cross sectioned side plan view showing the adjustment of the location of the dialing finger of the present invention.
Figure 3:
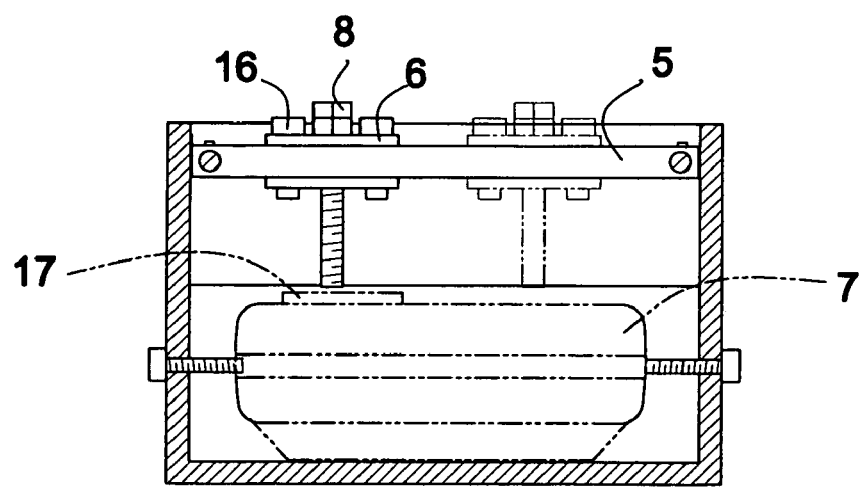
FIG. 3 is a schematic cross sectional view showing that after the adjustment of the dialing finger, the dialing finger is aligned with the dialing button of the cell phone received in the casing of the present invention.

A bracket (5) is slidably mounted between the two crossbars (4) and has two extension holes (51) respectively defined in two opposed ends of the bracket (5) to correspond to and allow extension of the two crossbars (4) and an elongated slot (52) defined through the bracket (5). Two securing bolts (15) are provided to respectively extend through the two opposed ends of the bracket (5) to secure the bracket (5) on the two crossbars (4). Two securing plates (6) are respectively provided to two opposed sides of the bracket (5). Each securing plate (6) has multiple threaded holes defined therein so that positioning bolts (16) and a dialing finger (8) sandwiched between the two positioning bolts (16) are able to threadingly extend through the two securing plates (6). It is noted that the dialing finger (8) has a length longer than that of each positioning bolt (16). The cell phone (7) with a specific dialing button (17) is to be received in the first receiving room (100) and is secured inside the first receiving room (100) by the threaded bolts (37). After the cell phone (7) is securely received in the first receiving room (100), a distal end of the dialing finger (8) is located on top of the dialing button (17) of the cell phone (7) as shown in FIGS. 2 and 3. Furthermore, in order to adjust the dialing finger's (8) length extending over the two securing plates (6), a nut (18) is sandwiched between the dialing finger (8) and a top face of one of the securing plates (6).

After the cell phone (7) is secured inside the first receiving room (100), an alarm electrical circuit which is mounted within the vehicle and conventional in the art is operably connected to the induced magnet (2). Therefore, when the alarm electrical circuit is triggered by an unauthorized person trying to steal or sabotage the vehicle, the alarm electrical circuit activates the induced magnet (2) to energize the induced magnet (2). After the induced magnet (2) is energized, the bar (2) is attracted to move toward the induced magnet (2), which drives the connection plate (91) to move accordingly. Due to the pivotal connection of the spacer (9) to the inner sides of the casing (1), the two crossbars (4) are driven to move downward toward the cell phone (7). As a result, the dialing finger (8) is able to actuate the dialing button (17) and then the cell phone (7) is able to dial a predetermined number to alert the user that there is an abnormal situation happening to the vehicle.

Thereafter, even if the alarm electrical circuit is sabotaged by the unauthorized person, because the cell phone is still activated and thus a radio signal is still being transmitted, the authority is able to trace the radio signal to locate the vehicle's whereabouts and begin investigations.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An onboard automatic cell phone dialing device comprising:

a casing adapted to be embedded inside the vehicle and provided with one open end, a baffle formed inside the casing to divide an interior of the casing into a first receiving room for receiving therein a cell phone and a second receiving room to receive therein an induced magnet adapted to be operably connected to a control circuit, the induced magnet having a bar movably connected to the induced magnet and multiple threaded bolts extending through the casing for positioning the cell phone in the first receiving room in the casing;

two crossbars respectively provided to two opposed inner sides inside the casing, each crossbar having a first end and a second end;

a spacer sandwiched between the two crossbars and having two ends securely connected to the two first ends of the two crossbars and pivotally connected to the two inner sides of the casing and a connection plate securely connected to the second ends of the two crossbars and a free end of the bar to allow the two crossbars to move according to the movement of the bar;

a bracket selectively and slidably mounted between the two crossbars and having an elongated slot defined through the bracket; and two securing plates respectively and movably mounted on two opposed sides of the bracket, each securing plate having multiple threaded holes aligned with the elongated slot of the bracket to allow extension of two positioning bolts to secure a position of the two securing plates relative to the bracket and a dialing finger which is sandwiched between the two positioning bolts for alignment with a dialing button on the cell phone such that after the induced magnet is energized, the bar is able to move toward the induced magnet so that the connection plate and the two crossbars are driven by the bar to move toward the induced magnet, which enables the dialing finger to engage with the dialing button to activate the cell phone to send out a radio signal.

* * * * *